United States Patent
Xiao et al.

(10) Patent No.: US 11,966,213 B2
(45) Date of Patent: Apr. 23, 2024

(54) HANDHELD PROGRAMMER FOR LED DRIVERS

(71) Applicant: ABL IP HOLDING LLC, Atlanta, GA (US)

(72) Inventors: Peng Xiao, Andover, MA (US); Alex Oksengendler, Buffalo Grove, IL (US); Shashank Nalla, Andover, MA (US); Naveen Tumula, Danvers, MA (US)

(73) Assignee: ABL IP Holding LLC, Atlanta, GA (US)

( * ) Notice: Subject to any disclaimer, the term of this patent is extended or adjusted under 35 U.S.C. 154(b) by 299 days.

(21) Appl. No.: 16/983,179

(22) Filed: Aug. 3, 2020

(65) Prior Publication Data

US 2022/0035338 A1    Feb. 3, 2022

(51) Int. Cl.
*H05B 45/30* (2020.01)
*G05B 19/4155* (2006.01)
*H04W 76/10* (2018.01)

(52) U.S. Cl.
CPC ........ *G05B 19/4155* (2013.01); *H04W 76/10* (2018.02); *H05B 45/30* (2020.01); *G05B 2219/23154* (2013.01)

(58) Field of Classification Search
CPC ..... G05B 19/4155; G05B 2219/23154; H04W 76/10; H05B 45/30; H05B 47/17; H05B 45/00
See application file for complete search history.

(56) References Cited

U.S. PATENT DOCUMENTS

| 7,391,297 | B2* | 6/2008 | Cash | H05B 47/195 |
| | | | | 315/318 |
| 9,544,951 | B1* | 1/2017 | O'Neil | H05B 45/382 |
| 2003/0057887 | A1* | 3/2003 | Dowling | H05B 47/175 |
| | | | | 315/291 |
| 2006/0187081 | A1* | 8/2006 | Gloisten | H05B 45/37 |
| | | | | 340/4.3 |
| 2018/0160511 | A1* | 6/2018 | Haverlag | H05B 47/11 |
| 2018/0270932 | A1* | 9/2018 | Mayrhofer | H05B 47/175 |
| 2019/0138281 | A1* | 5/2019 | O'Neil | G06F 1/266 |

FOREIGN PATENT DOCUMENTS

CN    106201630 A    * 12/2016    ........... G06F 3/0484

OTHER PUBLICATIONS

Osram, "Copy and Paste LED driver configurations—OSRAM Tuner4TRONIC Part 5", Jul. 31, 2019, Youtube video URL:<https://www.youtube.com/watch?v=duGJVaeWvZY> (Year: 2019).*

(Continued)

*Primary Examiner* — Kenneth M Lo
*Assistant Examiner* — Jonathan Michael Skrzycki
(74) *Attorney, Agent, or Firm* — Kilpatrick Townsend & Stockton LLP

(57) ABSTRACT

The systems and methods disclosed herein include a handheld programmer for replacing LED drivers in the field. The handheld programmer includes a communications module configured to communicate with a first light emitting diode (LED) driver and a second LED driver, and a processor configured to read a plurality of settings from the first LED driver and program the second LED driver with the plurality of settings from the first LED driver.

16 Claims, 5 Drawing Sheets

(56) References Cited

OTHER PUBLICATIONS

Wikipedia, "Digital Addressable Lighting Interface", Jul. 2020, taken from archive.org URL:<https://web.archive.org/web/20200716162159/https://en.wikipedia.org/wiki/Digital_Addressable_Lighting_Interface> (Year: 2020).*

Wikipedia, "RS-485", taken from archive.org image on Jul. 19, 2020; URL:<https://web.archive.org/web/20200719002227/https://en.wikipedia.org/wiki/RS-485> (Year: 2020).*

* cited by examiner

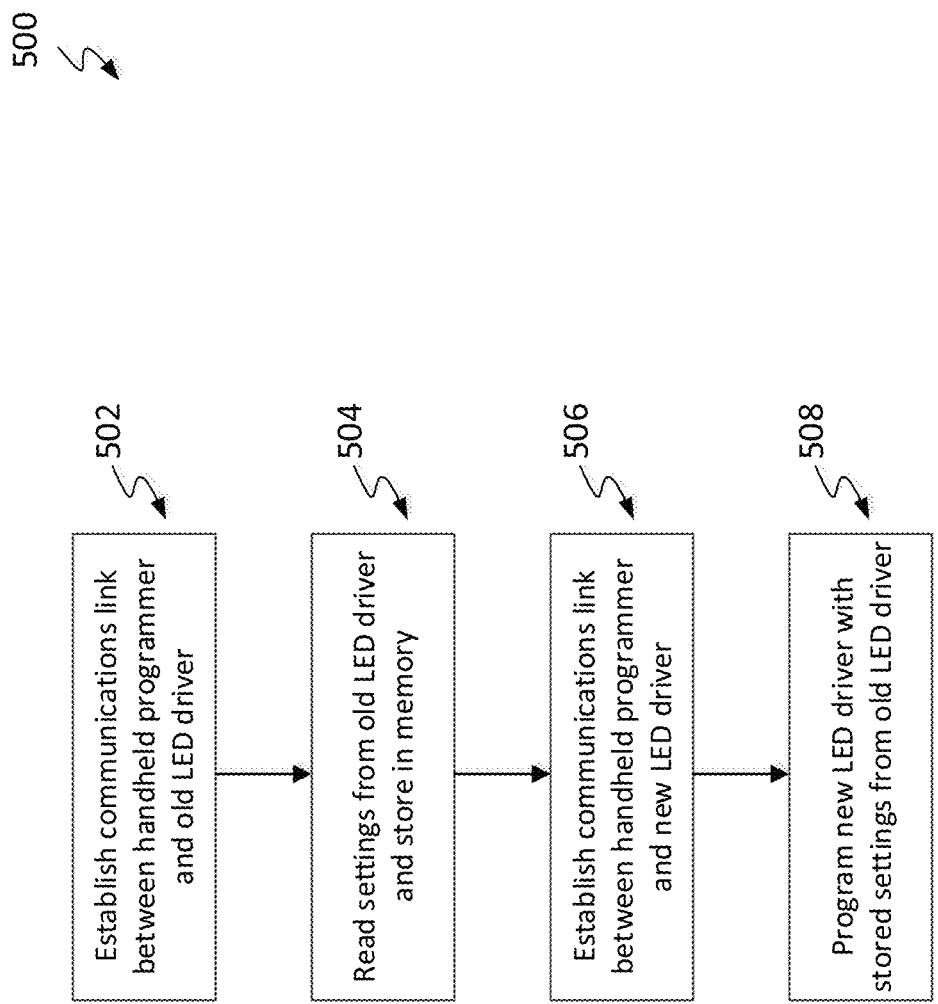

HANDHELD PROGRAMMER FOR LED DRIVERS

FIELD OF THE DISCLOSURE

This disclosure relates to light emitting diode (LED) drivers, and specifically to portable LED driver programmers and methods of programming LED drivers in the field.

BACKGROUND

LEDs have gained wide-spread use and are now the dominant source of light for both consumer and commercial lighting applications, mainly due to its high energy efficiency, better light quality, and versatile form factor. One key component of LED luminaires is the LED driver, which acts like a power supply for the LED load. For example, the driver may transform power from a power source to a level suitable for powering the LED load, and also control the voltage and/or current flowing to the LED load (e.g., for dimming purposes). However, LED drivers have a limited lifetime. When an LED driver is no longer functional or an upgrade is desired, a replacement LED driver is needed. The replacement LED driver must match the original one in terms of settings such as output current level and dimming characteristics in order to ensure optimal performance and prevent damage to the LEDs.

For different LED luminaires, the LED driver output and dimming characteristics may vary greatly depending on the application. In order to replace an LED driver, an electrical service personnel would have to figure out the existing settings of the old driver, order an equivalent or compatible LED driver from the manufacturer, have the manufacturer program their LED driver product based on the existing settings of the old luminaire, and receive the programmed LED drivers for installation. This is very time-consuming and error prone, as sometimes the service personnel may not be able to identify the exact configuration of the existing LED drivers. Thus what is needed in the art are more efficient ways to replace LED drivers while maintaining the same operating settings of the old drivers.

SUMMARY

The implementations disclosed herein include a handheld programmer, including a communications module configured to communicate with a first light emitting diode (LED) driver and a second LED driver and a processor configured to read a plurality of settings from the first LED driver, and program the second LED driver with the plurality of settings from the first LED driver.

In some implementations, the processor is further configured to store the plurality of settings in memory. In some implementations, the handheld programmer communicates with the first LED driver and the second LED driver via a wired connection. In some implementations, the communications module is further configured to communicate with a set of LED drivers including the second LED drivers, and the processor is further configured to program each of the set of LED drivers with the plurality of settings from the first LED driver. In some implementations, the processor initiates reading the plurality of settings based on a user input. In some implementations, the processor initiates programming the second LED driver based on a user input. In some implementations, the processor is further configured to program the second LED driver based on user input. In some implementations, the plurality of settings includes at least one of an output current of the first LED driver, an output voltage of the first LED driver, dimming characteristics, LED thermal protection protocols, constant lumen maintenance protocols, end-of-life behavior, auxiliary power output, and dim-to-off settings. In some implementations, the first LED driver and the second LED driver are made by different manufacturers.

Further implementations disclosed herein include a method of programming light emitting diode (LED) drivers. The method includes establishing a first communications link between a handheld programmer and a first LED driver, reading, by the handheld programmer, a plurality of settings from the first LED driver, establishing a second communications link between a handheld programmer and a second LED driver, and programming, by the handheld programmer, the second LED driver with the plurality of settings from the first LED driver.

In some implementations, the method further includes storing, by the handheld programmer, the plurality of settings in memory. In some implementations, at least one of the first communications link and the second communications link is a wired connection. In some implementations, at least one of the first communications link and the second communications link is a wireless connection. In some implementations, the method further includes establishing a plurality of communications links with a plurality of LED drivers, including the second LED drivers, and programming, by the handheld programmer, each of the plurality of LED drivers with the plurality of settings from the first LED driver. In some implementations, the handheld programmer initiates reading the plurality of settings based on a user input. In some implementations, the handheld programmer initiates programming the second LED driver based on a user input. In some implementations, the handheld programmer programs the second LED driver based on user input. In some implementations, the plurality of settings includes at least one of an output current of the first LED driver, an output voltage of the first LED driver, dimming characteristics, LED thermal protection protocols, constant lumen maintenance protocols, end-of-life behavior, auxiliary power output, and dim-to-off settings. In some implementations, the first LED driver and the second LED driver are made by different manufacturers.

BRIEF DESCRIPTION OF THE DRAWINGS

FIG. 5 is a flow chart illustrating a method of utilizing a handheld LED driver programmer in accordance with various implementations.

These and other features of the present implementations will be understood better by reading the following detailed description, taken together with the figures herein described. The accompanying drawings are not intended to be drawn to scale. For purposes of clarity, not every component may be labeled in every drawing.

DETAILED DESCRIPTION

The systems and methods described herein includes a portable LED driver programmer that users (e.g., service technicians) may use in the field to replace old LED drivers. The handheld programmer may be configured to communicate with the old LED driver and extract its operational settings and store it in memory. The programmer is also configured to communicate with the new or replacement LED driver and program the new driver with the settings extracted from the old driver. This enables quick and easy replacement of LED drivers in the field.

This also allows electrical service vendors to have a stock of generic LED drivers. When a LED driver needs to be replaced, the service personnel uses the handheld programming device to read the exact settings from the existing driver, and program the fresh generic driver with these settings. This provides a means for service personnel to read from and write information to a LED driver without powering up the driver and without connecting it to a computer, which is cumbersome for field work. It significantly reduces the time needed to get the correct replacement LED driver, and minimizes the chance of getting incorrect settings from existing drivers. For existing LED drivers that cannot be read or those made by manufacturers that don't support the same protocol, the service personnel may manually select the settings and program replacement drivers to match them. Thus the overall labor and material cost of LED driver replacement is much lower utilizing portable LED driver programmers.

Figure 1:
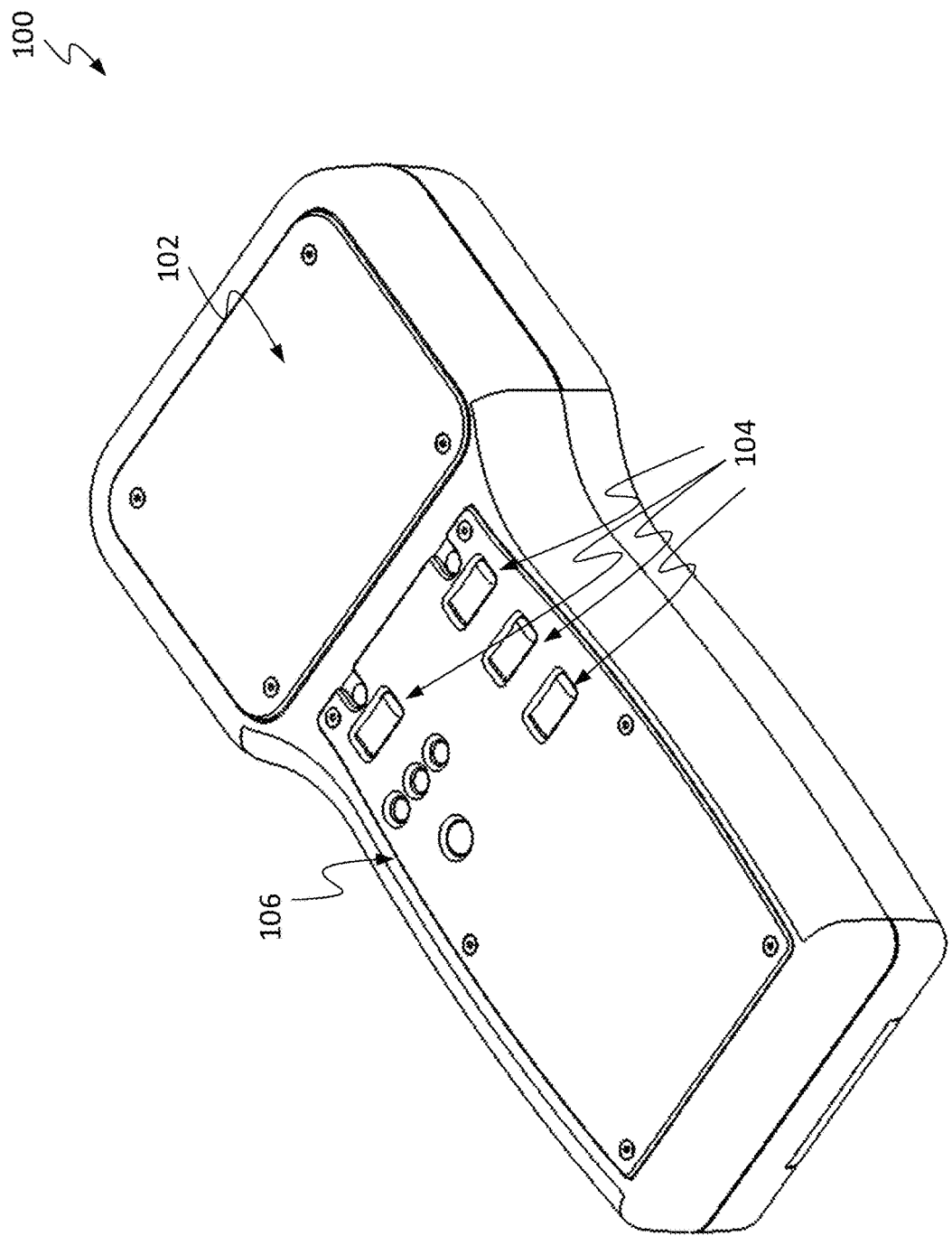
FIG. 1 is a diagram illustrating a handheld LED driver programmer in accordance with various implementations.

FIG. 1 is a diagram illustrating a handheld LED driver programmer 100 in accordance with various implementations. The handheld programmer 100 may include a display 102, a plurality of buttons 104, and a plurality of indicator lights 106. The display 102 may be used to display certain information to the user, such as LED driver settings. The plurality of buttons 104 may each have different functions, such as a power button, a read button that reads driver settings from an LED driver, a program button that initiates programming of an LED driver, and increment and decrement buttons that increase and decrease the value of selected driver settings (e.g., current). The plurality of indicator lights 106 may be used to indicate different information, such as read/write operation modes, user-selected dimming levels, and various fault conditions. The handheld programmer 100 may be battery powered, powered via a USB cable, powered via an electrical outlet, or other means.

A user may establish a communications link between the handheld programmer 100 and an old LED driver to be replaced. The communications link may be a wired connection between the handheld programmer 100 and the LED driver, or may be a wireless link if the LED driver is capable of wireless communication. A user may then press a button 104 (e.g., a READ button) that puts the handheld programmer 100 into read mode, which allows it to read the settings of the LED driver. The LED driver may be configured to respond to digital command inputs over a two-wire interface, described in further detail below. When the LED driver is powered from the handheld programmer 100 instead of an AC power supply, the LED driver may enter a program mode in which it is able to decode voltage level changes with a proprietary protocol. Bidirectional communication may be established by pulling current pulses from the handheld programmer 100, allowing the LED driver to send information back to the handheld programmer 100. The settings may include the output current and/or voltage level at which the LED driver provides power to the LED load, the dimming characteristics, LED thermal protection protocols, constant lumen maintenance protocols, end-of-life behavior, auxiliary power output, dim-to-off settings, and other features that may be found in LED drivers. The settings are then stored in memory.

The user may then establish a communications link between the handheld programmer 100 and a new LED driver. The user may then press another button 104 (e.g., a PROGRAM button) so that the handheld programmer 100 may program the new LED driver with the settings read from the old LED driver. For example, the handheld programmer 100 may decode voltage signals via the communications link to obtain address and data information of the settings stored in the LED driver, and then change the corresponding setting values in the LED driver's internal memory at the specified addresses. The indicator lights 106 may provide feedback to the user about the current status of operation. Audible feedback may be used in addition or alternatively to visual feedback. The handheld programmer 100 may also include security features (e.g., passcode protection) such that only authorized users may use the handheld programmer to read and program LED drivers.

In some instances, the handheld programmer 100 may be unable to read the settings from an LED driver, for example due to incompatibilities with communication protocols or when the LED driver is not configured for any type of communication. In such a case, the user may use the buttons 104 to manually configure the new LED driver. In order to manually program the new LED driver, the user may need to know the nominal output current level and minimum dimming level of the old LED driver. This information may be obtain from markings or labels on the fixture powered by the LED driver, or by measuring the current levels of another functioning lighting fixture using the same configuration and settings as the lighting fixture that is being fixed.

Thus the handheld programmer 100 is able to copy settings from one LED driver to another LED driver. The old and new LED drivers do not have to be from the same manufacturer. The new LED driver may be a different model, from a different manufacturer, or may have different communication protocols from the old LED driver. As long as the handheld programmer 100 can communicate with the old LED driver and extract information from it, it enables easy driver setting matching when replacing LED drivers.

The handheld programmer 100 may include other features not shown in FIG. 1, such as additional user input and output features like speakers and antennas. The shape of handheld programmer 100 and the layout of the display 102, the buttons 104, and the indicator lights 106 is not limited to that shown in FIG. 1, but may include any shape or layout known to persons of skill in the art.

Figure 2:
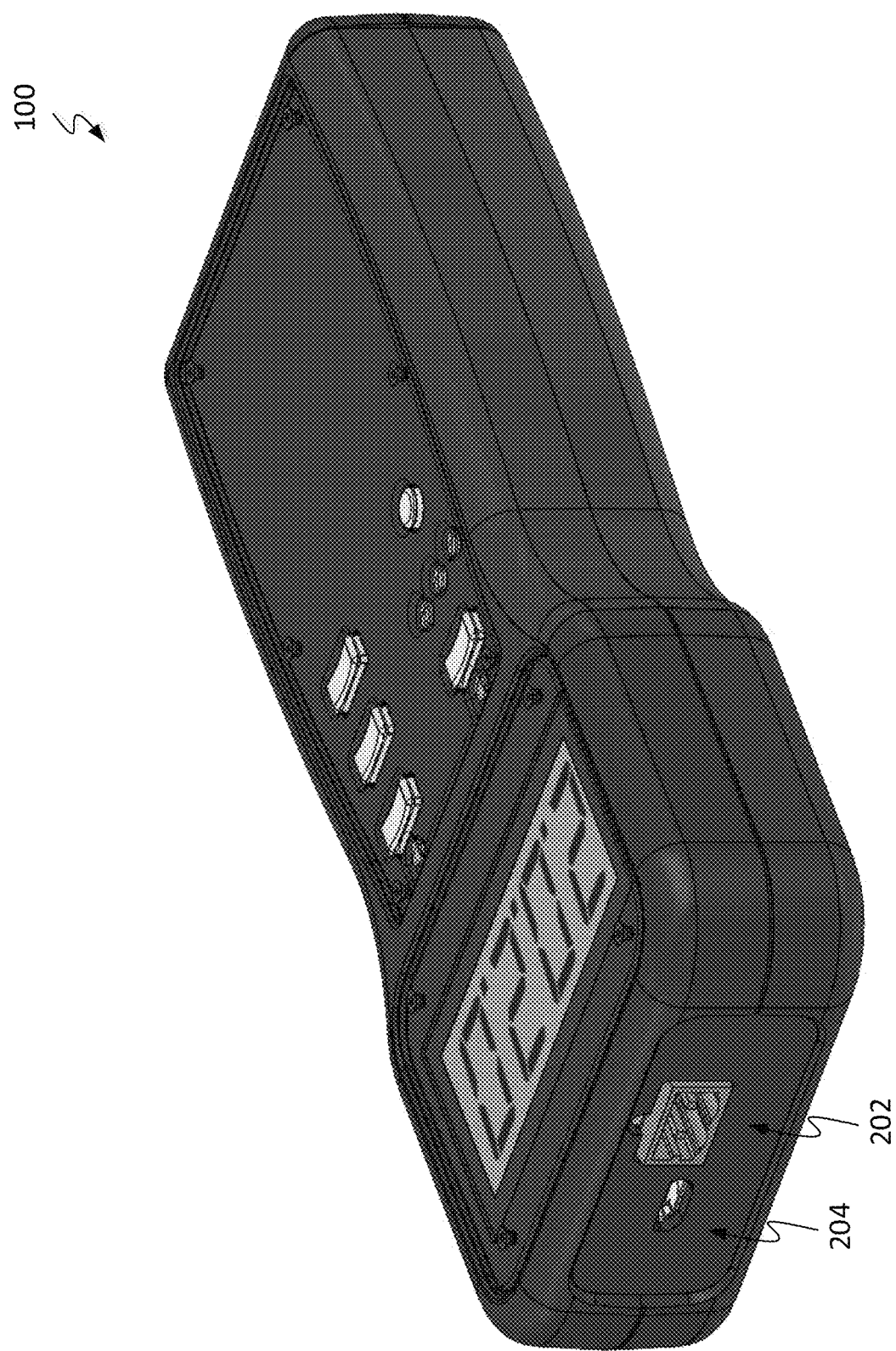
FIG. 2 is another diagram illustrating a handheld LED driver programmer in accordance with various implementations.

FIG. 2 shows another view of the handheld LED driver programmer 100 in accordance with various implementations. In this view, connector ports 202 and 204 are visible. The connector port 202 may be used to facilitate a wired connection between the handheld programmer 100 and an LED driver. The connector port 204 may be used to facilitate a wired connection between the handheld programmer 100 and another device that may be used to program, calibrate, or re-calibrate the handheld programmer (e.g., a computing device).

Figure 3:
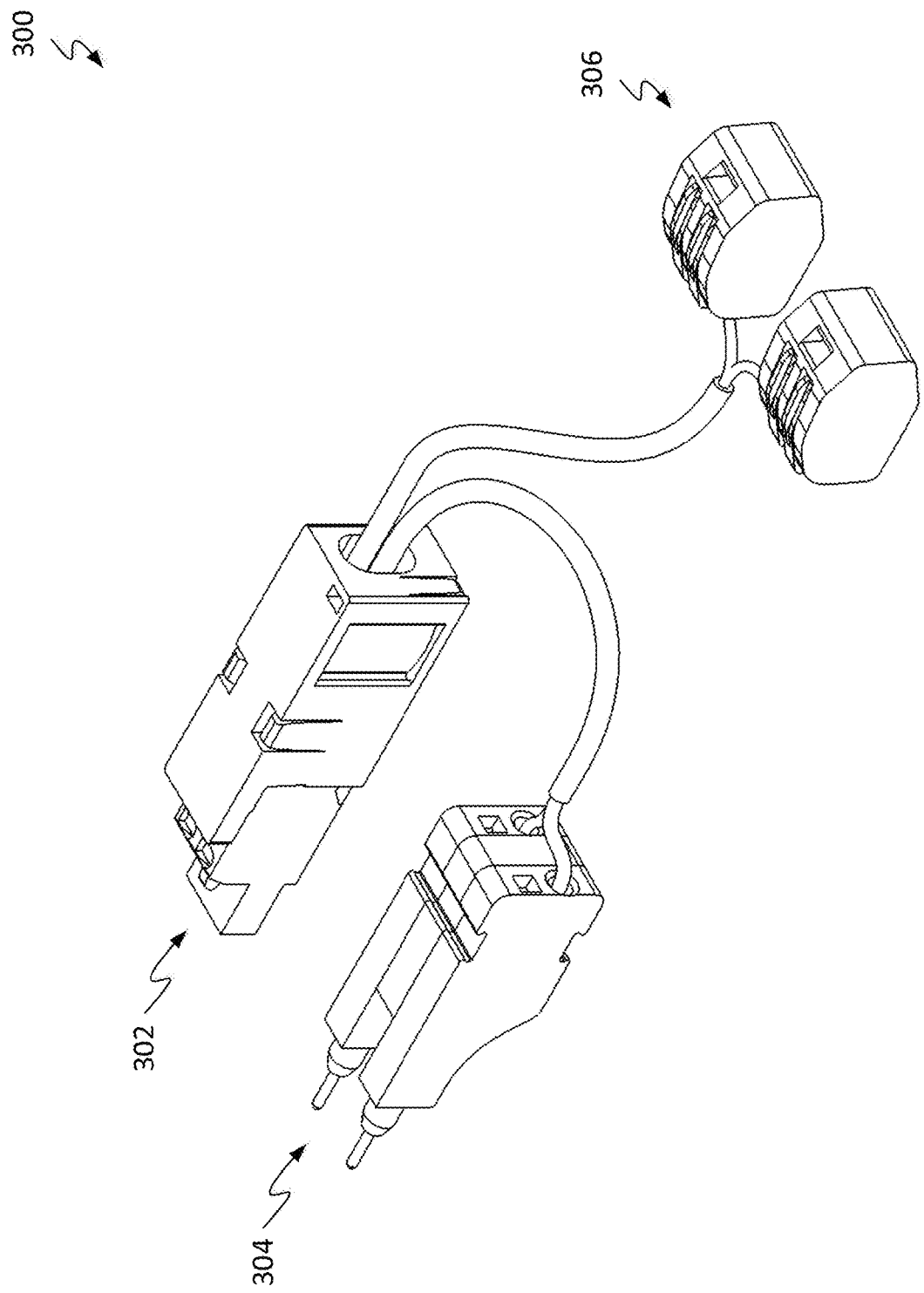
FIG. 3 is a diagram illustrating a connector between a LED driver and a handheld LED driver programmer in accordance with various implementations.

FIG. 3 a diagram illustrating a wired connector 300 between a LED driver and a handheld LED driver programmer in accordance with various implementations. The connector 300 may include a first end 302 with plugs that insert into the connector port 202 on the handheld programmer 100. The connector 300 may also include multiple second ends that insert into the communication port of an LED driver. For example, the connector 300 may include a first plug 304 that inserts into certain types of LED drivers, such as outdoor-located LED drivers, and a second plug 306 that inserts into other types of LED drivers, such as indoor-located LED drivers. In some implementations, the handheld programmer 100 may include additional second end plugs to accommodate different communication ports that may be found on different LED drivers. In alternate implementations, the handheld programmer 100 may utilize multiple connectors 300. Each connector may have the same first end 302 that plugs into the handheld programmer 100 but have different second ends, each including only one plug, to accommodate different communication ports that may be found on different LED drivers. In some implementations, the first end 302 of the connector 300 may be permanently attached to the handheld programmer 100 while in other implementations it is removable. The shape of the plugs on connector 300 is not limited to that shown in FIG. 3, but may encompass any wired communications plugs used to communicate with LED drivers.

Figure 4:
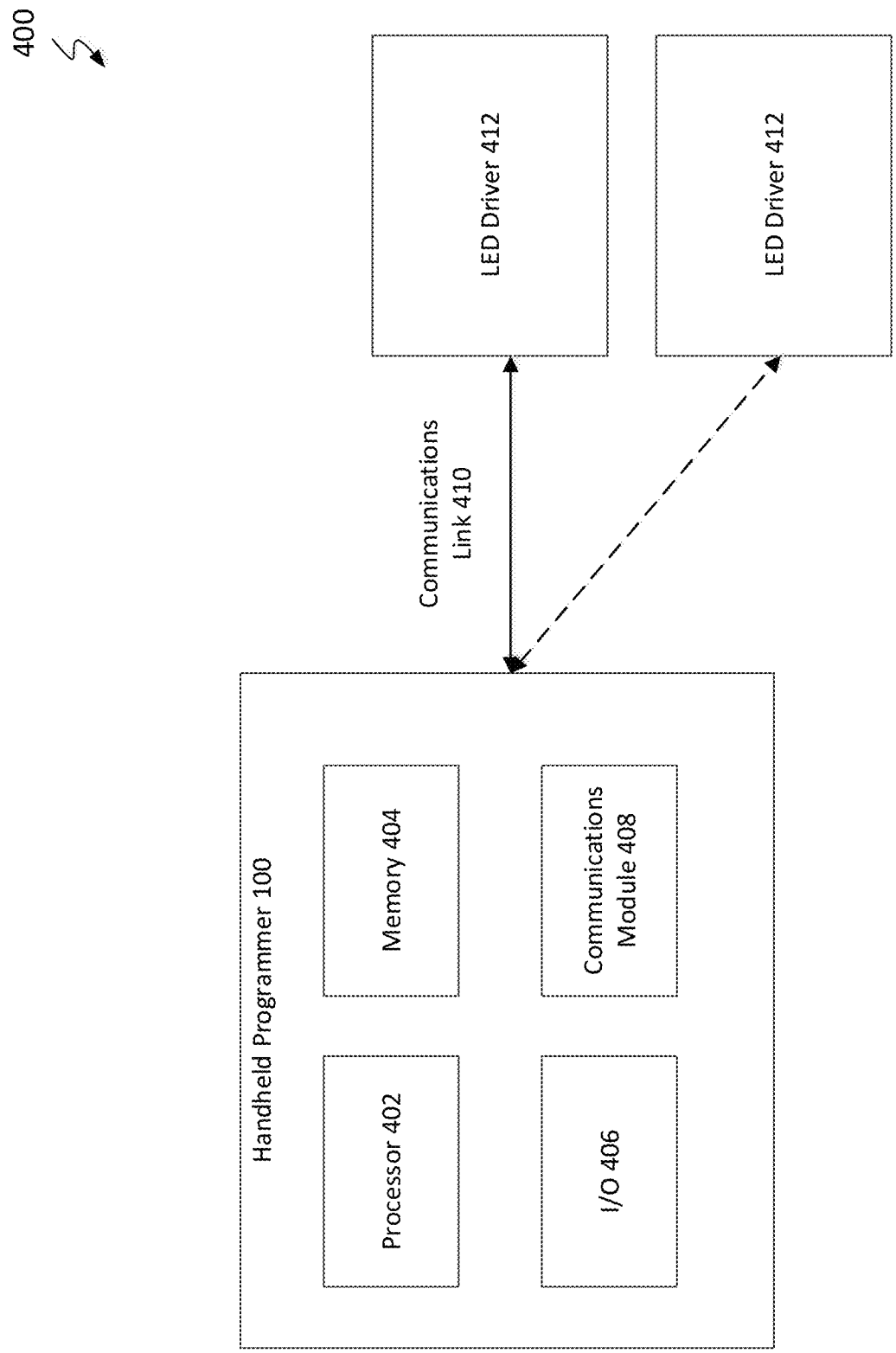
FIG. 4 is a block diagram illustrating a handheld LED driver programmer interacting with one or more LED drivers in accordance with various implementations.

FIG. 4 is a block diagram illustrating a system 400 including the handheld LED driver programmer 100 interacting with one or more LED drivers 412 in accordance with various implementations. The handheld programmer 100 may include a processor 402, memory 404, input/output module 406, and a communications module 408. The handheld programmer 100 may include other components not shown in FIG. 4. The processor 402 may be configured to read settings from LED drivers and program LED drivers with stored settings via the communications module 408. The memory 404 may be configured to store LED driver settings and the operating instructions for the processor 402. The input/output module 406 may include various user input and output components, such as the display 102, the buttons 104, and the indicator lights 106 shown in FIG. 1, as well as other components such as a speaker. The communications module 408 may be configured to accommodate wired connection, wireless communication (e.g., Bluetooth, Zigbee, WiFi, near field communications), or both, between the handheld programmer 100 and the LED drivers 412.

The handheld programmer 100 may establish a bidirectional communications link 410 between the handheld programmer 100 and a LED driver 412. The communications link 410 may either be a wired connection (e.g., using connector 300 in FIG. 3) or a wireless connection if the LED driver 412 is configured for wireless communication. In some implementations, the handheld programmer 100 may communicate with multiple LED drivers 412 simultaneously, either through wired or wireless connections. This may allow the handheld programmer 100 to program multiple LED drivers 412 at the same time, for example if multiple LED drivers 412 should be programmed with the same settings.

FIG. 5 is a flow chart illustrating a method 500 for utilizing a handheld LED driver programmer in accordance with various implementations. The method 500 may be performed by a handheld LED driver programmer, such as handheld programmer 100. In block 502, the handheld programmer may establish a communications link between the programmer and a LED driver. This LED driver may be, for example, an old or malfunctioning driver that should be replaced. The communications link may either be wired or wireless. For example, a user may use a connector (e.g., connector 300) to connect the handheld programmer with the LED driver. In another example, the LED driver may be configured for Bluetooth communication and so the handheld programmer uses Bluetooth to communicate with the LED driver.

In block 504, the handheld programmer may read settings from the LED driver and store those settings in its memory. This may be done in response to a user pressing a button on the handheld programmer that initiates the read process. The settings that are read and stored may include, but are not limited to, the output current and/or voltage level at which the LED driver provides power to the LED load, the dimming characteristics, LED thermal protection protocols, constant lumen maintenance protocols, end-of-life behavior, auxiliary power output, dim-to-off settings, and other features that may be found in LED drivers.

After the handheld programmer has read and stored the settings from the old LED driver, in block 506, the handheld programmer may establish a communications link between the programmer and a new LED driver. Again, this communications link may either be a wired or wireless connection.

In block 508, the handheld programmer may program the new LED driver with the settings read from the old LED driver. This may be done in response to a user pressing a button on the handheld programmer that initiates the programming process. In some implementations, the handheld programmer may initiate communications links with more than one LED driver and program each LED driver with the same settings simultaneously. In some implementations, a user may manually program the new LED driver if the settings from the old LED driver were unable to be read and stored.

OTHER CONSIDERATIONS

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, Blu-Ray, magnetic disk, internal hard drive, external hard drive, memory stick, flash drive, solid state memory device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some implementations, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s), handheld device(s) such as cellular telephone(s) or smartphone(s) or tablet(s), laptop(s), laptop/tablet hybrid(s), handheld computer(s), smart watch(es), or any another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The foregoing description of the implementations of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A handheld programmer, comprising:
   a communications module configured to communicate with a first programmable light emitting diode (LED) driver and a plurality of second programmable LED drivers, wherein the first programmable LED driver and the plurality of second programmable LED drivers communicate with the handheld programmer using different communication protocols, and the handheld programmer is simultaneously connected to the first programmable LED driver and the plurality of second programmable LED drivers over different wireless or wired connections; and
   a connector port configured to connect the handheld programmer by a wired connector to the first programmable LED driver;
   a processor configured to:
      transition the handheld programmer to a read mode in response to receiving a button press, wherein while the handheld programmer is in the read mode, the handheld programmer provides power to the first programmable LED driver through the wired connector which allows the first programmable LED driver to enter a program mode;
      read a plurality of settings from the first programmable LED driver while the first programmable LED driver is in the program mode; and
      simultaneously program the plurality of second programmable LED drivers with the plurality of settings from the first programmable LED driver.

2. The handheld programmer of claim 1, wherein the processor is further configured to store the plurality of settings in memory.

3. The handheld programmer of claim 1, wherein the handheld programmer communicates with the first programmable LED driver via the wired connector.

4. The handheld programmer of claim 1, wherein the processor initiates programming the plurality of second programmable LED drivers based on a user input.

5. The handheld programmer of claim 1, wherein the processor is further configured to program the plurality of second programmable LED drivers based on user input.

6. The handheld programmer of claim 1, wherein the plurality of settings includes at least one of an output current of the first programmable LED driver, an output voltage of the first programmable LED driver, dimming characteristics, LED thermal protection protocols, constant lumen maintenance protocols, end-of-life behavior, auxiliary power output, and dim-to-off settings.

7. The handheld programmer of claim 1, wherein the first programmable LED driver and the plurality of second programmable LED drivers are made by different manufacturers.

8. A method of programming programmable light emitting diode (LED) drivers, comprising:
   establishing a first communications link between a handheld programmer and a first programmable LED driver wherein the first programmable LED driver communicates using a first communication protocol;
   reading, by the handheld programmer, a plurality of settings from the first programmable LED driver;
   establishing a second communications link between the handheld programmer and a plurality of second programmable drivers, wherein the plurality of second programmable LED drivers communicates using a second communication protocol different from the first communication protocol, and the handheld programmer is simultaneously connected to the first programmable LED driver and the plurality of second programmable LED drivers through different wired or wireless connections; and
   simultaneously programming, by the handheld programmer, the plurality of second programmable LED drivers with the plurality of settings from the first LED programmable driver.

9. The method of claim 8, the method further comprising:
   storing, by the handheld programmer, the plurality of settings in memory.

10. The method of claim 8, wherein at least one of the first communications link and the second communications link is a wired connection.

11. The method of claim 8, wherein at least one of the first communications link and the second communications link is a wireless connection.

12. The method of claim 8, wherein the handheld programmer initiates reading the plurality of settings based on a user input.

13. The method of claim 8, wherein the handheld programmer initiates programming the plurality of second programmable LED drivers based on a user input.

14. The method of claim 8, wherein the handheld programmer programs the plurality of second programmable LED drivers based on user input.

15. The method of claim 8, wherein the plurality of settings includes at least one of an output current of the first programmable LED driver, an output voltage of the first programmable LED driver, dimming characteristics, LED thermal protection protocols, constant lumen maintenance protocols, end-of-life behavior, auxiliary power output, and dim-to-off settings.

16. The method of claim 8, wherein the first programmable LED driver and the plurality of second programmable LED drivers are made by different manufacturers.

* * * * *